(12) United States Patent
Van Bommel et al.

(10) Patent No.: US 10,481,316 B2
(45) Date of Patent: Nov. 19, 2019

(54) LIGHT EMITTING ARRANGEMENT FOR ILLUMINATED SURFACES

(71) Applicant: SIGNIFY HOLDING B.V., Eindhoven (NL)

(72) Inventors: Ties Van Bommel, Eindhoven (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/541,571

(22) PCT Filed: Dec. 18, 2015

(86) PCT No.: PCT/EP2015/080572
§ 371 (c)(1),
(2) Date: Jul. 5, 2017

(87) PCT Pub. No.: WO2016/110400
PCT Pub. Date: Jul. 14, 2016

(65) Prior Publication Data
US 2017/0351018 A1 Dec. 7, 2017

(30) Foreign Application Priority Data
Jan. 6, 2015 (EP) .................................... 15150193

(51) Int. Cl.
*F21V 8/00* (2006.01)
*F21V 9/30* (2018.01)
(Continued)

(52) U.S. Cl.
CPC ................ *G02B 6/001* (2013.01); *F21S 8/03* (2013.01); *F21V 9/30* (2018.02); *F21V 33/0012* (2013.01);
(Continued)

(58) Field of Classification Search
CPC ......... G02B 6/001; G02B 6/0006; F21V 9/30; F21V 33/0012; F21V 33/0028; F21S 8/03
(Continued)

(56) References Cited

U.S. PATENT DOCUMENTS 5,021,928 A 6/1991 Daniel
6,851,844 B2 2/2005 Guy
(Continued)

FOREIGN PATENT DOCUMENTS

EP 2447746 A1 5/2012
GB 2461689 A 1/2010

*Primary Examiner* — Andrew J Coughlin
(74) *Attorney, Agent, or Firm* — Stephen M. Kohen

(57) ABSTRACT

A light emitting arrangement (100, 200, 300) is provided, comprising: —a body (10) of solid material having a surface (11); —a light guiding member (101, 110) partially embedded into said body, having a plurality of discrete light outcoupling regions (103) comprising light outcoupling means (230, 730, 830, 930) distributed along a longitudinal direction of the light guiding member, and a plurality of discrete, non-outcoupling regions (102) distributed along a longitudinal direction of the light guiding member, wherein said plurality of light non-outcoupling regions of the light guiding member are embedded by said body and said plurality of light outcoupling regions of the light guiding member are exposed on the surface of said body, wherein said non-outcoupling regions (102) form light incoupling regions comprising light incoupling means (220, 320, 420, 520, 620); and —a plurality of solid state light sources (12) embedded within said body (10) of solid material arranged to emit light towards said light incoupling regions. The light emitting arrangement provides a body with an illuminated surface, and the plurality of light outcoupling regions enables efficient lighting, with no or little loss of light.

20 Claims, 4 Drawing Sheets

(51) Int. Cl.
    *F21S 8/00*     (2006.01)
    *F21V 33/00*     (2006.01)
    *F21W 131/00*     (2006.01)
    *F21W 131/301*     (2006.01)
    *F21Y 105/00*     (2016.01)
    *F21Y 115/10*     (2016.01)
    *F21W 121/00*     (2006.01)

(52) U.S. Cl.
    CPC ........ *F21V 33/0028* (2013.01); *G02B 6/0006* (2013.01); *F21V 33/006* (2013.01); *F21W 2121/00* (2013.01); *F21W 2131/00* (2013.01); *F21W 2131/301* (2013.01); *F21Y 2105/00* (2013.01); *F21Y 2115/10* (2016.08)

(58) Field of Classification Search
    USPC .......................................................... 362/551
    See application file for complete search history.

(56) References Cited

U.S. PATENT DOCUMENTS

| | | |
|---|---|---|
| 8,538,217 B2 | 9/2013 | Li |
| 2004/0032748 A1* | 2/2004 | Trudeau .............. B28B 23/0037 362/554 |
| 2004/0188639 A1 | 9/2004 | Masuda et al. |
| 2007/0103924 A1* | 5/2007 | Lath .......................... G01V 8/10 362/551 |
| 2009/0129115 A1* | 5/2009 | Fine ..................... G02B 6/0021 362/606 |
| 2009/0141476 A1* | 6/2009 | Meir ...................... G02B 6/005 362/84 |
| 2010/0053990 A1 | 3/2010 | Brochier et al. |
| 2014/0049980 A1 | 2/2014 | Pijlman et al. |
| 2014/0185316 A1 | 7/2014 | Kim et al. |

* cited by examiner

LIGHT EMITTING ARRANGEMENT FOR ILLUMINATED SURFACES

CROSS-REFERENCE TO PRIOR APPLICATIONS

This application is the U.S. National Phase application under 35 U.S.C. § 371 of International Application No. PCT/EP2015/080572, filed on Dec. 18, 2015, which claims the benefit of European Patent Application No. 15150193.9, filed on Jan. 6, 2015. These applications are hereby incorporated by reference herein.

FIELD OF THE INVENTION

The present invention relates to light emitting arrangements integrated with solid objects to provide illuminated surfaces.

BACKGROUND OF THE INVENTION

Solid state lighting devices are increasingly used for a wide variety of lighting applications. Solid state light sources offer advantages over traditional light sources, such as incandescent and fluorescent lamps, including long lifetime, high lumen efficacy, low operating voltage and fast modulation of lumen output, and, due to their small size have opened up new possibilities of integrating lighting with other functions. For instance, solid state solutions for providing illuminated surfaces are currently attracting attention. Illuminated surfaces may be used for general or decorative lighting, creating a desired indoor ambiance, light patterns, signage, etc.

One way of providing an illuminated surface is to use light emitting diodes (LEDs) arranged in a desired pattern on or beneath the surface to be illuminated. However, since LEDs are point light sources, very large numbers of LEDs may be required, which adds to manufacturing cost.

Another approach is to use laser light that is coupled into a light guide, e.g. an optical fiber, which is attached to or partly embedded into a surface, e.g. of a wall or a ceiling. However, known solutions using such a light guide suffer from low efficiency due to leakage of light from the light guide and absorption of light by the surface material.

Hence there is a need in the art for improvements with regard to illuminated surfaces useful e.g. for signage or decorative illumination.

SUMMARY OF THE INVENTION

It is an object of the present invention to at least partly overcome the problems of the prior art, and to provide means for efficiently illuminating a surface, in particular a light emitting arrangement adapted for this purpose.

According to a first aspect of the invention, this and other objects are achieved a light emitting arrangement comprising:

a body of solid material having a surface;

a light guiding member partially embedded into said body, said light guiding member having a plurality of discrete light outcoupling regions comprising light outcoupling means, said discrete outcoupling regions being distributed along a longitudinal direction of the light guiding member, and a plurality of discrete, non-outcoupling regions distributed along a longitudinal direction of the light guiding member, wherein said plurality of light non-outcoupling regions of the light guiding member are embedded by said body and said plurality of light outcoupling regions of the light guiding member are exposed on the surface of said body; and at least one solid state light source arranged to emit light towards at least one light incoupling region of the light guiding member.

Light emitted by said solid state light source can thus be coupled into the light guiding member via the light incoupling region, propagate through the light guiding member by total internal reflection, according to Snell's law, and subsequently be outcoupled at the outcoupling regions. Hence, instead of all light being guided to a distal end of the light guide, as is usually the case of with an optical fiber, light is coupled out of the light guide at multiple sites distributed over the length of the light guide. The light emitting arrangement thus provides a body with an illuminated surface. The use of a light guide with a plurality of discrete light outcoupling regions distributed over the length of the light guide enables efficient lighting, with no or little loss of light e.g. by absorption of the solid material. The light emitting arrangement is also highly versatile as any desirable illumination pattern can be provided on the surface in question.

The light outcoupling regions and the non-outcoupling regions may be arranged alternatingly in the longitudinal direction along the light guide.

The non-outcoupling regions of the light guiding member comprise light incoupling means and thus form light incoupling regions which are buried beneath the surface of the body. A plurality of solid state light sources are embedded within the body of solid material and arranged to emit light towards said light incoupling regions. Hence, light emitted by the embedded solid state light sources is coupled into the light guiding member at multiple sites, which allows high light intensity and a light intensity distribution along the light guide which may be adapted to as desired.

The light outcoupling regions and the light in-coupling regions may be arranged alternatingly in the longitudinal direction along the light guide.

In embodiments, the light incoupling regions, which comprise light incoupling means, may be evenly distributed along the length of the light guiding member. Thus, even more uniform distribution of light within the light guiding member can be achieved.

In embodiments, at least one further light incoupling region comprising light incoupling means may be located at a lateral face of the light guiding member, e.g. at an end of an optical fiber, and at least one further solid state light source may be arranged to emit light towards said lateral face and said at least one further light incoupling region, such that light emitted by said further solid state light source can be coupled into the light guiding member via the lateral face. In order to provide a higher light intensity and/or more uniform light distribution along the length of the light guiding member, the light emitting arrangement may comprise at least two further light incoupling regions located at opposing lateral faces of the light guiding member (e.g., at opposing ends of an optical fiber) and at least two further solid state light sources arranged on opposing sides of said light guiding member, each solid state light source being arranged to emit light towards a respective lateral face and one of said at least two light incoupling regions. Thus, light may be coupled into the light guiding member from two lateral faces (e.g., the two ends of an optical fiber).

In embodiments, each light incoupling region may comprise light incoupling means arranged on a surface of the light guiding member. In some embodiments, the light incoupling means may comprise a coating covering a part of the surface of the light guiding member. In other embodiments, the light incoupling means may comprise a coating or sheath enclosing a longitudinal portion of the light guiding member, for example forming a tubular coating in the case where the light guiding member is an optical fiber. Applying the light incoupling means as a continuous coating over a portion of the surface of the light guiding member may require less precise positioning of an associated light source compared to a case where the light incoupling region comprises light incoupling means in the form of a discontinuous coating or pattern of light incoupling material.

The light incoupling means may comprise an optically coupling, transparent material. Alternatively the light incoupling means may comprise a wavelength converting material to provide light incoupling as well as wavelength conversion of at least part of the light emitted by the light source(s). Where the light incoupling means comprises a wavelength converting material, the wavelength converting material may advantageously be transparent, producing little or no scattering of the light emitted by the light source. A transparent or non-scattering wavelength converting material, such as nano-sized inorganic phosphors particles or quantum dots, or an organic phosphor material molecularly dissolved in a matrix, in the light incoupling regions may increase the efficiency of the light emitting arrangement as no or very little light is scattered upon being coupled into the light guiding member.

In embodiments where the light incoupling means comprises a wavelength converting material it may be particularly advantageous to use light incoupling means enclosing a longitudinal portion of the light guiding member as described above, as this may increase the amount of light converted by the wavelength converting material.

In embodiments, each light outcoupling region may comprise light outcoupling means arranged on a surface of the light guiding member. The light outcoupling means may comprise a light outcoupling material or a light outcoupling structure, e.g. a topographical structure. The light outcoupling means may comprise at least one of a light diffracting structure or material, a light refracting structure or material, and a light scattering structure or material. Additionally or alternatively, the light outcoupling means may comprise a wavelength converting material to provide light outcoupling as well as wavelength conversion of at least part of the light coupled out at, or emitted from, the corresponding light outcoupling region. Advantageously, a wavelength converting member used in the light outcoupling regions may be a scattering wavelength converting material, e.g. particles comprising inorganic or organic phosphor having a particles size of at least 100 nm.

For example, the light outcoupling means may comprise a coating of a light outcoupling material (e.g., a scattering material) covering a part of the surface of the light guiding member. In some embodiments, the light outcoupling means may comprise a coating enclosing a longitudinal portion of the light guiding member, for example forming a tubular coating in the case where the light guiding member is an optical fiber. In embodiments where the light outcoupling means comprises a wavelength converting material it may be particularly advantageous to use light outcoupling means enclosing a longitudinal portion of the light guiding member as described above, as this may increase the chance of light conversion.

In embodiments of the light emitting arrangement, the light guiding member may be an optical fiber core. In other embodiments the light guiding member may be in the form of a plate or sheet. The light guiding member may optionally be flexible. The light emitting arrangement may further comprise a conventional cladding enclosing part of the light guiding member, in particular those parts that are not intended as light incoupling regions or light outcoupling regions. Thus, there is typically no cladding around those parts of the light guiding member covered by or associated with light incoupling means or light outcoupling means, as the purpose of the cladding is partly to provide physical protection of the light guiding member and partly to prevent leakage of light from the light guide at portions where light outcoupling is not desired.

In embodiments of the light emitting arrangement the surface of the body may be planar and the light guiding member may be at least partially curved, e.g. undulating. Thus, for example, the light guiding member may be arranged to repeatedly to appear on, or above, and disappear from (beneath) a surface. However it is also envisaged that the surface may be non-planar, and the light guiding member may have any desirable shape or configuration. In some embodiments, less than 70% by volume of the light guiding member may be embedded by the solid body, such that at least 30% by volume of the light guiding member is exposed on the surface of said body. For example, less than 50%, e.g. less than 30%, by volume of the light guiding member may be embedded into the solid body, such that at least 50%, e.g. at least 70%, by volume of the light guiding member is positioned exposed on the surface of said body.

The body into which the light guiding member is partly embedded may be made of a solid material, optionally non-transparent, for example metal, wood, mineral (e.g., stone), plastic, composites, textile, paper or any combination thereof. The body of solid material may comprise, form part of, or may be adapted to be arranged on a wall, a ceiling, and/or a floor, or may comprise or form part of a piece of furniture or interior decoration. The light emitting arrangement according to the invention may in particular be used for special illumination purposes, e.g., decorative illumination or signage.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
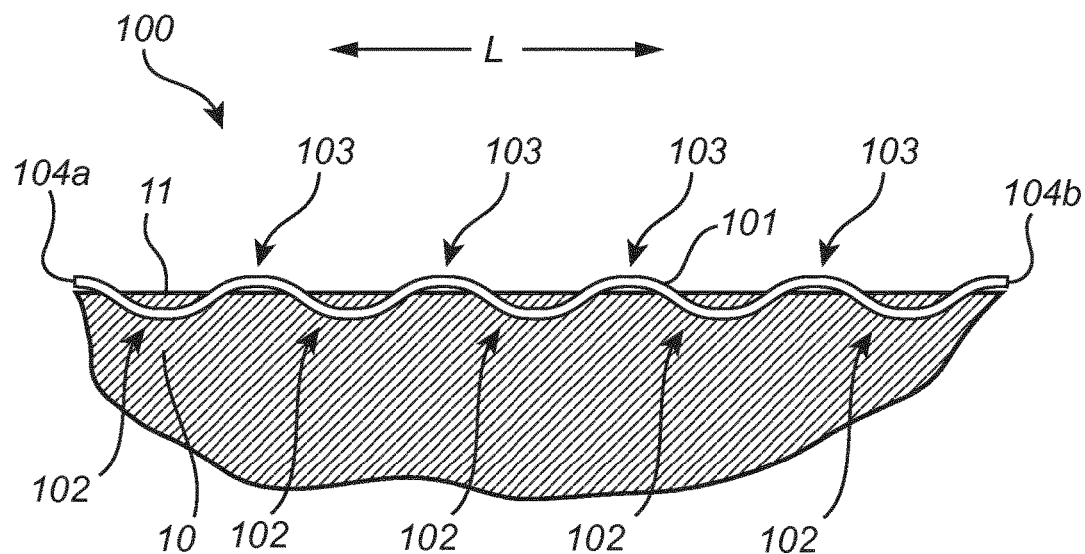
FIG. 1 is a cross-sectional side view showing general structures of a light emitting arrangement according to embodiments of the invention.

FIG. 1 illustrates general structures of a light emitting arrangement 100 according to embodiments of the invention. The light emitting arrangement 100 comprises a light guiding member 101, here in the form of an optical fiber. However, the light guiding member 101 may also be in the form of a sheet, seen from the side. In either case, the light guiding member, hereafter referred to as a light guide, has a longitudinal extension in at least one direction L.

The light guide 101 is partly embedded into a body 10 of solid material, such that parts or regions 102 of the light guide 101 are embedded or buried in the body 10, and other parts or regions 103 are exposed on the surface 11 of the body 10, e.g. protruding from the surface 11. As shown in the figure, the parts or regions 102 and the parts or regions 103 are alternatingly arranged in the longitudinal direction L. The regions 102 may be completely embedded in the body 10, whereas the regions 103 may be completely exposed. Thus, from a top view it would seem that the light guide 101 repeatedly appears on, or above, the surface 11 and repeatedly disappears from (or beneath) the surface 11. The body 10 may be made of a solid material, optionally non-transparent, for example metal, wood, mineral (e.g., stone), plastic, composites, textile, paper or combinations thereof.

Light is coupled into the light guide via light incoupling means (not shown) which may be located e.g. at the embedded regions 102 and in embodiments additionally at one or both of the lateral faces 104a, 104b of the light guide. Furthermore, the regions 103 form light outcoupling region and comprise light outcoupling means (not shown in FIG. 1) for extracting light from the light guide.

Figure 2:
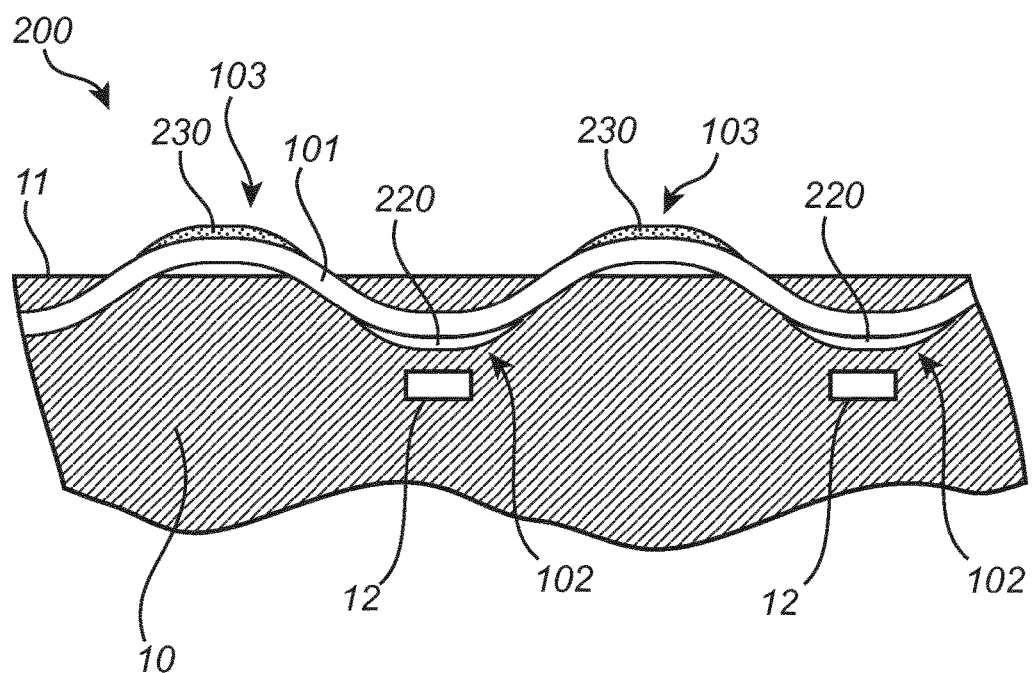
FIG. 2 is a cross-sectional side view of a light emitting arrangement according to embodiments of the invention.

FIG. 2 shows a closer view of a light emitting arrangement according to embodiments of the invention. The light emitting arrangement 200 comprises a body of solid material 10 partly embedding a light guide 101 having alternating regions 102 and 103, where the regions 102 are embedded into the body 10 and the regions 103 are exposed on the surface of the body 10, as described above. Further, FIG. 2 shows a plurality of solid state light sources 12, typically light emitting diodes (LEDs), embedded in the body 10 in the vicinity of the region 102 of the light guide 101 and directed to emit light towards the light guide. The regions 102 of the light guide comprise light incoupling means 220, which facilitate coupling of light emitted by the LEDs 12 into the light guide 101. Thus, the regions 102 may form light incoupling regions. The regions 103 comprise light outcoupling means 230 which enable outcoupling of light from the light guide. Hence, light emitted by the LEDs 12 is coupled into the light guide 101 at multiple sites (light incoupling regions 102) and propagate through the light guide 101 by total internal reflection, according to Snell's law. However, instead of all light being guided to a distal end of the light guide, as is usually the case of with an optical fiber, light is coupled out of the light guide at multiple sites (the light outcoupling regions 103) distributed over the length, or longitudinal extension, of the light guide.

In some embodiments, each embedded region 102 of the light guide may be associated with a light source 12 and may thus represent a light incoupling region 102. However, it is also possible that some of the embedded regions 102 are not associated with a light source and thus do not constitute light incoupling regions. Hence, an embedded region 102 of the light guide 101 may or may not represent a light incoupling region.

Furthermore, not all parts of the light guide exposed on the surface must comprise light outcoupling means. Hence, there may be parts of the light guide 101 exposed on the surface that do not represent, or comprise, light outcoupling regions.

To improve light distribution uniformity, the light incoupling regions 102 may be arranged at regular intervals along the length of the light guide 101. The distribution of the light outcoupling regions 103 may be regular or irregular, and can be adapted to provide a desired pattern of extracted light.

As mentioned above, the light source 12 may be an LED, for example a blue or violet LED, although LEDs of other colors are of course equally possible. The light source may be embedded into the body of solid material adjacent a light incoupling region of the light guide and in optical contact with the light incoupling means. The light source is typically arranged on a printed circuit board or lead frame (not shown) and connected to an external power supply and control circuitry via electrical leads, as appreciated by a person of skill in the art. A PCB or lead frame and any electrical leads may be at least partly embedded in the body 10.

The light source may be in more or less direct physical contact with the light guide via the light incoupling means. Optionally however the light source may be arranged at a distance from the light guide, as long as it is still in optical contact with the light incoupling means of the light guide.

Figure 3:
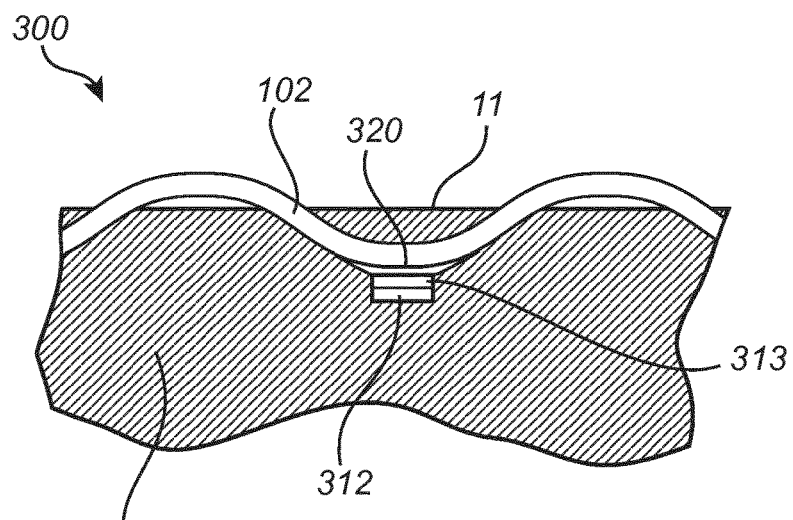
FIG. 3 is a cross-sectional side view of a light emitting arrangement according to embodiments of the invention, showing a possible configuration of a light source.

FIG. 3 shows an embodiment of a light emitting arrangement where the light source, in the form of a direct phosphor converted LED, is physically and optically coupled to the light guide 101 via the light incoupling means 320, here a layer of optical coupling material, such as silicone. Thus, the LED 12 may comprise a wavelength converting layer 313 applied on the LED, which wavelength converting layer 313 is in direct contact with the silicone material 320. In other embodiments such as illustrated in for example FIG. 2, the light source may be arranged at a distance from the light guide 101. In such embodiments however a transparent medium, such as an optically coupling material, may be provided to establish optical contact between the light source and a light incoupling region of the light guide.

Although FIGS. 2 and 3 show LEDs positioned beneath the light guide as seen from the surface 11, it is contemplated that the light source may also be positioned at the same depth as the light incoupling region of the light guide and beside it.

In some embodiments, in addition to light sources arranged along the length of the light guide e.g. as shown in FIGS. 2 and 3, solid state light sources, such as LEDs or laser light sources, may be arranged at lateral faces of the light guide, such as at the ends 104a, 104b of an optical fiber, and in optical contact with light incoupling means provided at said lateral faces, such that additionally light can be coupled into the light guide from one or both ends of the fiber. The lateral faces 104a, 104b and the light source(s) may in such cases either be embedded in the body 10 or solid material, or may be provided outside of the body 10, e.g. on a surface of the body. When light is coupled into the light guide from a lateral face or end, the light intensity may decrease along the light guide with increasing distance from the light source, and it may then be advantageous to compensate for this decrease by adapting the number and/or spatial distribution of the light outcoupling means in order to provide more even light output along the length of the light guide. The light source used in these embodiments may for example be a phosphor converted LED similar to the light source 312 of FIG. 3. Furthermore, in embodiments where the light incoupling regions are provided at one or both of the lateral faces of 104a, 104b, the light guide may optionally comprise a wavelength converting material mixed with the material of the light guide.

The light incoupling means may be provided as a coating, for example a wavelength converting coating or a transparent optical material. The coating may be adhesive and may attach the light source to the light guide, e.g. as shown in FIG. 3. In some embodiments, the light incoupling means may be etched into the material of the light guide, during manufacture thereof or later.

Figure 4:
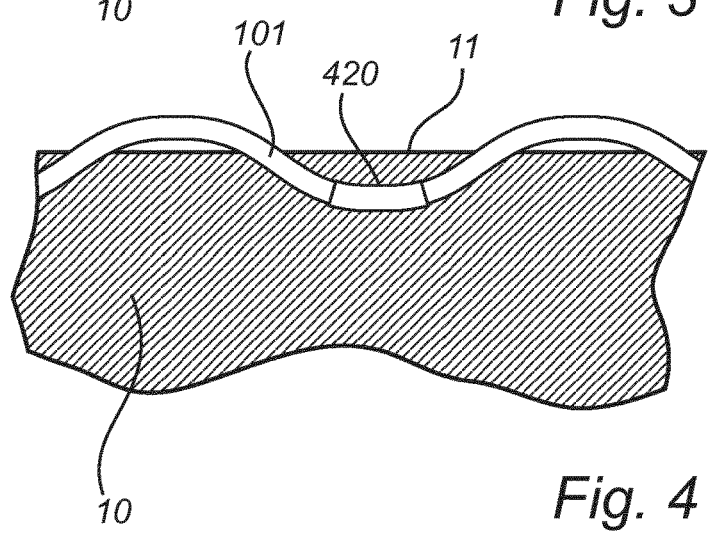
FIG. 4 is a cross-sectional side view of a light emitting arrangement according to embodiments of the invention, showing a possible variant of the light incoupling means.
Figure 5:
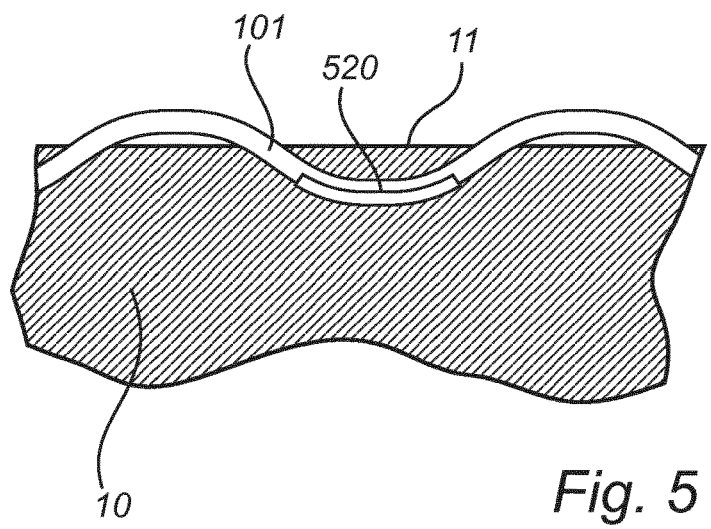
FIG. 5 is a cross-sectional side view of a light emitting arrangement according to embodiments of the invention, showing another variant of the light incoupling means.
Figure 6:
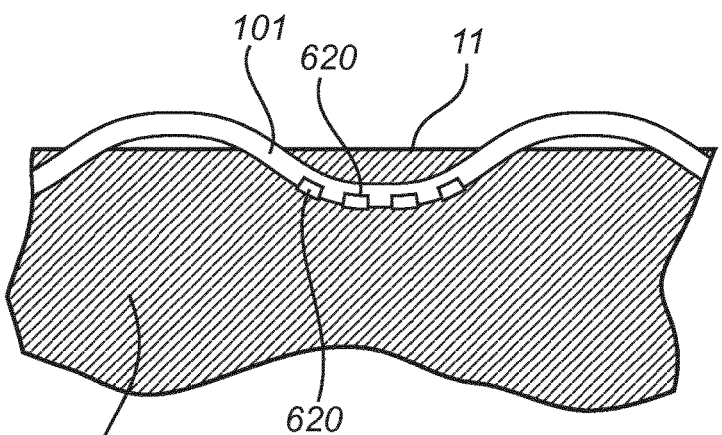
FIG. 6 is a cross-sectional side view of a light emitting arrangement according to embodiments of the invention, showing another variant of the light incoupling means.

FIGS. 4-6 illustrate different configurations of the light incoupling means. In some embodiments, represented in FIG. 4, the light incoupling means 420 are provided on the surface of the light guide 101 to completely cover, or enclose, a portion thereof. The light incoupling means may thus form a sleeve around a portion of the light guide, in particular in embodiments where the light guide is an optical fiber core. In other embodiments, e.g. as illustrated in FIG. 5, light incoupling means 520 may be provided as a coating primarily on one side of the light guide, typically the side thereof facing the light source. Thus, in such embodiments the light incoupling means 520 does not enclose or encircle the light guide.

In yet other embodiments, represented schematically in FIG. 6, the light incoupling means may be represented by a pattern 620 of light coupling material applied on the surface of the light guide. The light incoupling pattern 620 may be provided primarily on a surface of the light guide facing the light source, although it is also contemplated that a pattern could be provided all around a portion of the light guide in a manner corresponding to the embodiment shown in FIG. 4.

The light incoupling means of any embodiment of the light emitting arrangement described herein may optionally comprise a wavelength converting material. For example, a wavelength converting material may be dispersed in the form of particles or molecularly dissolved in an optical coupling material.

Further, the light outcoupling means of any embodiment may optionally comprise a wavelength converting material. For example, a wavelength converting material may be dispersed in the form of particles or molecularly dissolved in an optical coupling material.

Wavelength converting materials, also referred to as luminescent materials or phosphors, are inorganic or organic compounds capable of converting primary light, e.g. light emitted by a light source such as an LED, to secondary light having a different spectral distribution (usually light of longer wavelengths). The type of wavelength converting material used in the light emitting arrangements of the invention may be selected with due regard to the spectral properties of the light emitted by the light source and the desired spectral composition of the output light (i.e. the light extracted from the light guide via the light outcoupling regions). It is possible to use a combination of wavelength converting materials providing different colors of light in order to achieve output light having a desired color or other spectral property.

Examples of suitable inorganic wavelength converting material include cerium (Ce) doped yttrium aluminum garnet, YAG ($Y_3Al_5O_{12}$) or lutetium aluminum garnet, LuAG ($Lu_3Al_5O_{12}$). Ce doped YAG emits yellowish light, whereas Ce doped LuAG emits yellow-greenish light. Examples of other inorganic phosphors materials which emit red light may include, but are not limited to ECAS and BSSN; ECAS being $Ca_{1-x}AlSiN_3:Eu_x$ wherein $0<x\leq1$, preferably $0<x\leq0.2$; and BSSN being $Ba_{2-x-z}M_xSi_{5-y}Al_yN_{8-y}O_y:Eu_z$ wherein M represents Sr or Ca, $0\leq x\leq1$, $0\leq y\leq4$, and $0.0005\leq z\leq0.05$, and preferably $0\leq x\leq0.2$. Inorganic phosphors may be provided in particle form, dispersed in a matrix.

Examples of suitable organic wavelength converting materials for use in the present invention include organic luminescent materials based on perylene derivatives, for example the compounds sold under the name Lumogen® by BASF. Examples of suitable compounds include, but are not limited to, Lumogen® Red F305, Lumogen® Orange F240, Lumogen® Yellow F083, and Lumogen® F170. Organic wavelength converting materials have among other thing the advantage that their molecular structure can be designed such that the spectral peak position can be tuned. Another prominent feature of organic wavelength converting materials is that they may be molecularly dissolved in a matrix material and thus be transparent, i.e. non-scattering.

Alternatively, the wavelength converting material used in embodiments of the invention may be based on quantum dots, which are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide (CuInS2) and/or silver indium sulfide (AgInS2) can also be used. Quantum dots show very narrow emission band and thus they show saturated colors. Furthermore the emission color can easily be tuned by adapting the size of the quantum dots. Any type of quantum dot known in the art may be used in embodiments of the present invention. However, it may be preferred for reasons of environmental safety and concern to use cadmium-free quantum dots or at least quantum dots having very low cadmium content.

A light incoupling means comprising the wavelength converting material may be transparent, that is, essentially non-scattering. For example, an inorganic nano-sized phosphor may be used, such as quantum dots, or an organic phosphor which is molecularly dissolved in an optical coupling material.

Figure 7:
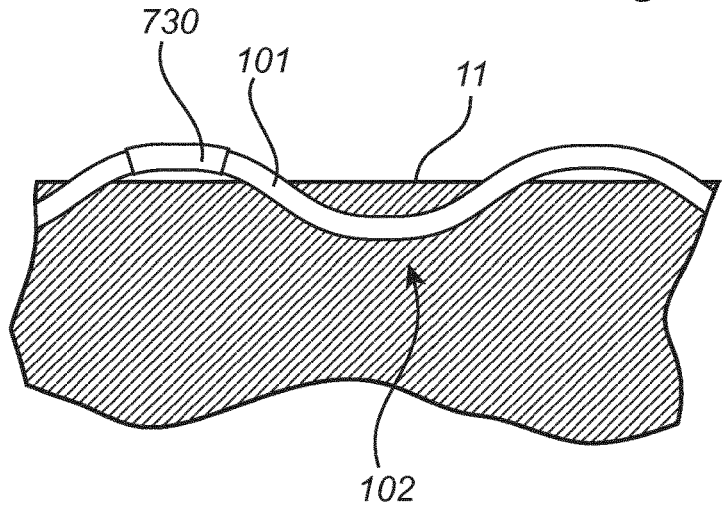
FIG. 7 is a cross-sectional side view of a light emitting arrangement according to embodiments of the invention, showing a possible variant of the light outcoupling means.
Figure 8:
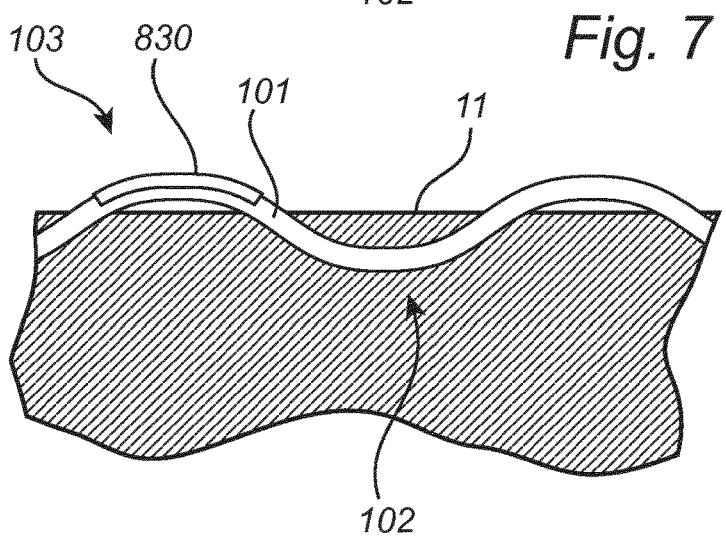
FIG. 8 is a cross-sectional side view of a light emitting arrangement according to embodiments of the invention, showing another variant of the light outcoupling means.
Figure 9:
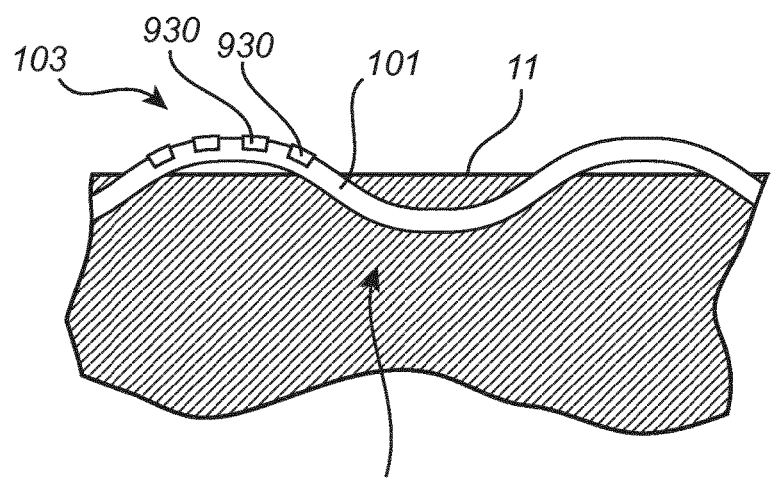
FIG. 9 is a cross-sectional side view of a light emitting arrangement according to embodiments of the invention, showing yet another variant of the light outcoupling means.

Turning to FIGS. 7-9, different variants of the light outcoupling means are shown. Generally, the light outcoupling means of the light outcoupling regions 103 of the light guide 101 may comprise a wavelength converting material, or a light diffracting, refracting or scattering material or structure. The light outcoupling means may be provided as a coating. In some embodiments, the light outcoupling means may be etched into the material of the light guide, during manufacture thereof or later.

FIG. 7 illustrate an embodiment in which the light guide 101 comprises light outcoupling means 730 provided on the surface of the light guide 101 to completely cover, or enclose, a portion thereof, the enclosed portion thus forming a light outcoupling region 103. The light outcoupling means may thus form a sleeve around a portion of the light guide, in particular in embodiments where the light guide is an optical fiber core. In other embodiments, e.g. as illustrated in FIG. 8, light outcoupling means 830 may be provided as a coating primarily on one side of the light guide, typically on a side thereof facing away from the surface 11 of the body and in the viewing direction of an observer. Thus, in such embodiments the light outcoupling means does not enclose or encircle the light guide. In yet other embodiments, represented schematically in FIG. 9, the light outcoupling means may be represented by a pattern 930 of light coupling material applied on the surface of the light guide. The light outcoupling pattern 930 may be provided primarily on a surface of the light guide facing away from the surface 11 and in the direction of an observer, although it is also contemplated that a pattern could be provided all around a portion of the light guide in a manner corresponding to the embodiment shown in FIG. 7.

The light outcoupling means of any embodiment of the light emitting arrangement described herein may optionally comprise a wavelength converting material. For example, a wavelength converting material may be dispersed in the form of particles or molecularly dissolved in an optical coupling material as described above with reference to the light incoupling means. Suitable wavelength converting materials include those mentioned above with reference to the light incoupling means. In embodiments where the light incoupling means as well as the light outcoupling means comprise wavelength converting material, the wavelength converting materials of the light incoupling means and the light outcoupling means, respectively, may be the same or different.

For the purpose of light outcoupling it may be preferable in some embodiments to use either a scattering wavelength converting material, such as wavelength converting particles of a sufficient size, for example at least 100 nm, or to combine non-scattering (transparent) wavelength converting particles or a molecularly dissolved organic wavelength converting material with inorganic scattering elements.

Thus, the light outcoupling means may comprise scattering elements, optionally in combination with a wavelength converting material. For instance scattering elements in the form of particles of reflective material, such as $TiO_2$, $Al_2O_3$ or $BaSO_4$, or combinations thereof, may be incorporated in an optically coupling material such as silicone or another material as described above.

The light guiding member described herein may be made of any suitable material, for example glass or plastic, and may optionally be flexible. Usually, the light guiding member is at least partly covered by a cladding which protects the light guiding material and which prevents undesired leakage of light from the light guide at its interfaces with other materials, such as the material of the solid body 10. However, the cladding is absent from any portions of the light guide covered by light incoupling means or light outcoupling means. Hence, the cladding of e.g. an optical fiber may need to be removed at portions that are to be covered or coated with light incoupling means or light outcoupling means, such that the light incoupling means and the light outcoupling means are in optical contact with the optical fiber core.

Figure 10:
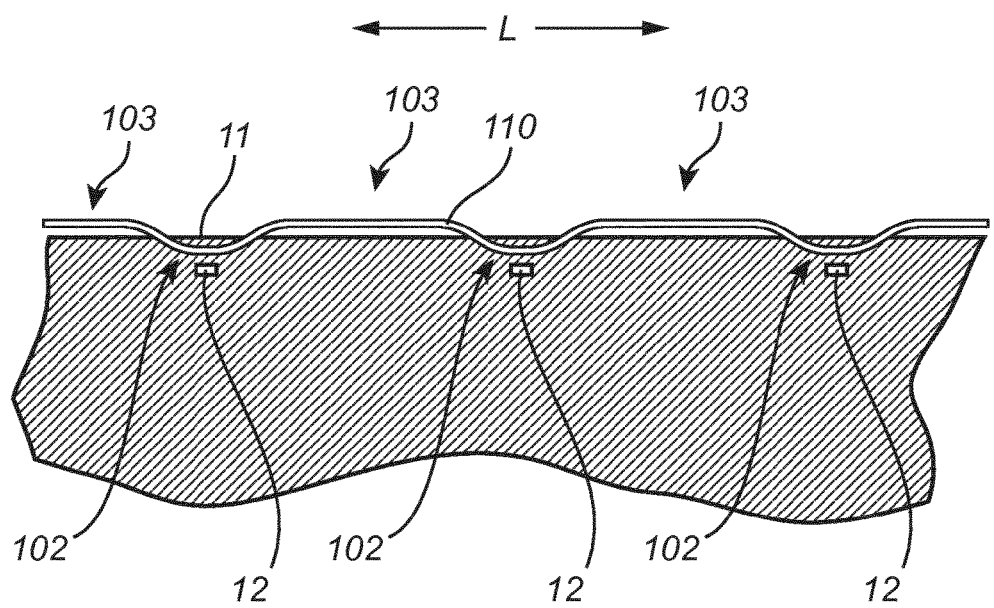
FIG. 10 is a cross-sectional side view of a light emitting arrangement according to embodiments of the invention.

The light emitting arrangement according to embodiments of the invention thus provides a light guide emitting light at selected portions along its length, partly embedded into the surface of a body of solid material. For example, at least 30% by volume of the light guide is not embedded into the body and thus exposed on the surface and thus available for light extraction. In some embodiments, at least 50%, or at least 70% by volume of the light guide is exposed and available for light extraction. FIG. 10 shows an example embodiment of a light emitting arrangement in which more than 50% by volume of a light guide 110 is exposed on the surface 11 of the body 10. Embedded regions 102, which here form light incoupling regions, constitute a lesser part, by volume, of the light guide as compared to the light outcoupling regions 103, which are exposed to the surroundings and visible to an observer.

The body 10 may be optionally non-transparent and may comprise any suitable material, synthetic or natural, and may form or form part of any kind of object, for example an object or material used for interior decoration or design. For instance, the body 10 may form or form part of a wall or a wall segment, a wallpaper, a ceiling or a ceiling tile (for suspended ceilings), a floor or a floor tile, a carpet, or a piece of furniture such as a table, a desk, a cupboard, a screen, a door, a chair or seat, etc.

The light guide may be manufactured by known methods, and it may subsequently be partly embedded or integrated into the surface of the solid body by insertion into holes or recesses in the body formed by any suitable means, e.g. drilling, cutting or the like, or by molding during production of the body itself. The light guide may optionally be joined with the body during manufacture of the body.

The person skilled in the art realizes that the present invention by no means is limited to the preferred embodiments described above. On the contrary, many modifications and variations are possible within the scope of the appended claims. For example, although all figures show a planar surface and a curved, undulating light guide it is contemplated that the surface as well as the light guide may have any shape.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting arrangement comprising:
a body of solid material having a surface;
a light guiding member partially embedded into the body, the light guiding member having a plurality of discrete light outcoupling regions and a plurality of discrete light non-outcoupling regions distributed along a longitudinal direction of the light guiding member, wherein the plurality of light non-outcoupling regions of the light guiding member are embedded in the body and the plurality of light outcoupling regions of the light guiding member are exposed on the surface of the body, wherein the plurality of light outcoupling regions comprise light outcoupling elements and the plurality of light non-outcoupling regions form light incoupling regions comprising light incoupling elements, and wherein at least one of the plurality of light outcoupling regions is coupled to two of the plurality of light non-outcoupling regions; and a plurality of solid state light sources embedded within the body and arranged to emit light towards the light incoupling regions.

2. The light emitting arrangement according to claim 1, further comprising at least one further light incoupling region comprising a light incoupling element located at a lateral face of the light guiding member.

3. The light emitting arrangement according to claim 1, further comprising at least two further light incoupling regions comprising light incoupling elements located at opposing lateral faces of the light guiding member.

4. The light emitting arrangement according to claim 1, wherein the plurality of light non-outcoupling regions forming light incoupling regions are evenly distributed along the length of the light guiding member.

5. The light emitting arrangement according to claim 1, wherein at least one of the light incoupling elements or at least one of the light outcoupling elements comprises a wavelength converting material.

6. The light emitting arrangement according to claim 1, wherein the light incoupling elements comprises a coating covering a part of the surface of the light guiding member.

7. The light emitting arrangement according to claim 1, wherein the light outcoupling elements comprises a coating covering a part of the surface of the light guiding member.

8. The light emitting arrangement according to claim 1, wherein at least one of the light incoupling elements and the light outcoupling elements comprises a coating enclosing a longitudinal portion of the light guiding member.

9. The light emitting arrangement according to claim 1, wherein the light guiding member is an optical fiber core.

10. The light emitting arrangement according to claim 1, further comprising a protective cladding enclosing parts of the light guiding member not associated with light incoupling elements or light outcoupling elements.

11. The light emitting arrangement according to claim 1, wherein the surface of the body is planar and the light guiding member is at least partially curved.

12. The light emitting arrangement according to claim 1, wherein less than 70% by volume of the light guiding member is embedded in the body, such that at least 30% by volume of the light guiding member is exposed on the surface of the body.

13. The light emitting arrangement according to claim 1, wherein less than 50% by volume of the light guiding member is embedded in the body, such that at least 50% by volume of the light guiding member is exposed on the surface of the body.

14. The light emitting arrangement according to claim 1, wherein the body of solid material comprises, forms part of, or is adapted to be arranged on at least one of a wall, a ceiling, or a floor, or comprises or forms part of a piece of furniture or interior decoration.

15. The light emitting arrangement according to claim 2, further comprising at least one further solid state light source arranged to emit light towards the light incoupling elements located at the lateral face of the light guiding member.

16. The light emitting arrangement according to claim 3, further comprising at least two further solid state light sources arranged to emit light towards a respective light incoupling element located at opposing lateral faces of the light guiding member.

17. The light emitting arrangement according to claim 1, wherein the light incoupling elements comprise an optically coupling and transparent material.

18. The light emitting arrangement according to claim 1, wherein the light outcoupling elements comprise a light outcoupling material or a light outcoupling structure.

19. The light emitting arrangement according to claim 18, wherein the light outcoupling material or the light outcoupling structure is diffracting, refracting, or scattering.

20. The light emitting arrangement according to claim 18, wherein the light outcoupling structure is etched into material of the light guiding member.

* * * * *